(12) United States Patent
Levine

(10) Patent No.: US 9,371,776 B2
(45) Date of Patent: Jun. 21, 2016

(54) DUAL FLOW AIR INJECTION INTRATURBINE ENGINE AND METHOD OF OPERATING SAME

(71) Applicant: Darren Levine, Canyon Country, CA (US)

(72) Inventor: Darren Levine, Canyon Country, CA (US)

(*) Notice: Subject to any disclaimer, the term of this patent is extended or adjusted under 35 U.S.C. 154(b) by 350 days.

(21) Appl. No.: 13/971,011

(22) Filed: Aug. 20, 2013

(65) Prior Publication Data

US 2015/0052902 A1    Feb. 26, 2015

(51) Int. Cl.
*F02C 3/16* (2006.01)
*F02C 7/236* (2006.01)

(52) U.S. Cl.
CPC .............. *F02C 3/16* (2013.01); *F02C 7/2365* (2013.01)

(58) Field of Classification Search
CPC ......................................................... F02C 3/16
USPC .......................................................... 60/735
See application file for complete search history.

(56) References Cited

U.S. PATENT DOCUMENTS

| | | | | | |
|---|---|---|---|---|---|
| 2,784,551 | A | * | 3/1957 | Henning | F02C 3/16 415/116 |
| 2,981,066 | A | * | 4/1961 | Johnson | F02C 3/16 415/115 |
| 3,088,281 | A | * | 5/1963 | Soltau | F23R 3/02 60/752 |
| 3,546,882 | A | * | 12/1970 | Berkey | F02C 7/18 415/79 |
| 3,705,775 | A | * | 12/1972 | Rioux | F01D 5/06 310/178 |
| 3,750,402 | A | * | 8/1973 | Vdoviak | F02K 1/386 60/262 |
| 4,043,121 | A | * | 8/1977 | Thomas | F02K 3/075 415/78 |
| 4,055,042 | A | * | 10/1977 | Colley | F02K 3/06 415/77 |
| 4,791,783 | A | * | 12/1988 | Neitzel | F01D 17/162 60/226.3 |
| 5,129,227 | A | | 7/1992 | Klees et al. | |
| 5,235,804 | A | * | 8/1993 | Colket, III | F02B 51/02 60/723 |
| 5,867,980 | A | * | 2/1999 | Bartos | F02K 7/16 60/226.1 |
| 6,302,683 | B1 | * | 10/2001 | Vestin | B60H 1/22 431/170 |
| 6,358,040 | B1 | * | 3/2002 | Pfefferle | F23C 6/04 431/170 |
| 6,393,831 | B1 | | 5/2002 | Chamis et al. | |
| 6,966,174 | B2 | * | 11/2005 | Paul | B64C 29/0075 60/224 |
| 7,007,486 | B2 | | 3/2006 | Sprouse et al. | |
| 7,007,487 | B2 | * | 3/2006 | Belokon | F23C 9/00 60/39.27 |
| 7,216,475 | B2 | | 5/2007 | Johnson | |
| 7,269,952 | B2 | | 9/2007 | Arar et al. | |
| 7,322,198 | B2 | | 1/2008 | Roby et al. | |
| 7,712,316 | B2 | | 5/2010 | Spangler | |
| 7,921,635 | B2 | * | 4/2011 | Suciu | F02C 3/073 415/77 |
| 8,099,944 | B2 | * | 1/2012 | Foster | F02C 6/18 60/226.1 |
| 8,549,833 | B2 | * | 10/2013 | Hyde | F02C 6/00 60/204 |
| 9,181,900 | B1 | * | 11/2015 | Lugg | F02K 5/00 |
| 2003/0221409 | A1 | * | 12/2003 | McGowan | F02C 3/30 60/39.17 |
| 2007/0126292 | A1 | * | 6/2007 | Lugg | F01D 5/03 310/11 |

OTHER PUBLICATIONS

Lefebvre, Gas Turbine Combustion, 2010 Taylor and Francis LLC, 3rd edition, Chap. 2, p. 37-38.*

* cited by examiner

*Primary Examiner* — Phutthiwat Wongwian
*Assistant Examiner* — Eric Linderman

(57) ABSTRACT

A jet engine having an air intake and a compression section having first and second separate flow paths coupled to the air intake, the second flow path containing a fuel rich, fuel air mixture having an equivalence rate above the mixture flammability limit, the first flow path containing only air, a burner turbine section, the compression section being coupled directly to the burner turbine section, and means for injecting air from the first flow path into the fuel rich fuel air mixture of the said flow path in the burner turbine section to generate intraturbine diffusion layer burning of said fuel air mixture.

5 Claims, 11 Drawing Sheets

DUAL FLOW AIR INJECTION INTRATURBINE ENGINE AND METHOD OF OPERATING SAME

BACKGROUND OF THE INVENTION

This invention relates generally to turbine engines and more particularly to such an engine that does not have a combustion chamber.

Gas turbine engines are known and include a plurality of sections which are typically mounted in series. Typically a fan delivers air to a compressor. Air is compressed in the compressor and delivered downstream to be mixed with fuel and combusted in a combustion section. The products of combustion move downstream over turbine rotors. The turbine rotors include a plurality of blades which rotate with the rotors and are driven by the products of combustion. The turbine rotors drive components within the gas turbine engine including the fan and the compressor. An afterburner may also be utilized downstream from the turbine section followed by a nozzle. The products of combustion along with air bypassing the engine core produces thrust.

In order to improve the performance of turbine engines, particularly the turbojet or turbofan engines, it has been common to increase sizes, rotational speeds and/or operating temperatures. This has presented challenges to building reliable engines and has also increased weight. There is thus a need for a turbofan gas turbine engine which is smaller than the currently-utilized turbofan engines but at the same time produces increased thrust and is more efficient in operation.

SUMMARY OF THE INVENTION

An engine which includes an air intake and a compressor section having first and second separate flow paths coupled to the air intake, the first flow path containing only air and the second flow path containing a fuel rich fuel air mixture having an equivalence ratio above the mixture's flammability limit, a burner turbine section coupled directly to the compressor section without passing through a combustion chamber and means for injecting air from the first flow path into the fuel rich fuel air mixture of the second flow path in the burner turbine section to generate intraturbine diffusion layer burning of the fuel air mixture.

The operation of the engine of the present invention includes providing an air flow into the intake of the engine, splitting the air flow into two separate and distinct air flow paths, injecting fuel into one of the two flow paths in an amount sufficient that the equivalence ratio thereof is above the mixture's flammability limit, compressing the air and the fuel rich air fuel mixture, injecting the fuel rich mixture into a burner turbine section of the engine, and injecting air from the first flow path into the burner turbine section to generate intraturbine diffusion layer burning of the fuel air mixture and continuing the burning.

DETAILED DESCRIPTION OF THE PREFERRED EMBODIMENTS

In accordance with a preferred embodiment of the present invention, the engine includes an air intake into which air moves into a compressor section of the engine. The compressor section of the engine includes two separate and distinct flow paths. The air in the first flow path is compressed by the compressor section. At the same time fuel is injected into the second flow path of the compressor in an amount such that the equivalence ratio of the fuel air mixture is above the mixture's flammability limit and the compressor compresses this fuel rich fuel air mixture and at the same time thoroughly mixes the fuel and the air. The compression of the fuel air mixture heats the mixture to above its auto ignition temperature, however, because the equivalence ratio of the mixture is well above the flammability limit, ignition or burning does not occur. The hot fuel rich fuel air mixture is then directed into a turbine section of the engine. Once it is into the burner turbine section, air under pressure from the first flow path is introduced into the burner turbine section and when this occurs, diffusion layer burning is generated so that intraturbine burning occurs and continues until the fuel rich mixture's equivalence ratio has been dropped from the high number at which it entered the turbine to the fuel's upper flammability limit equivalence ratio.

Figure 1:
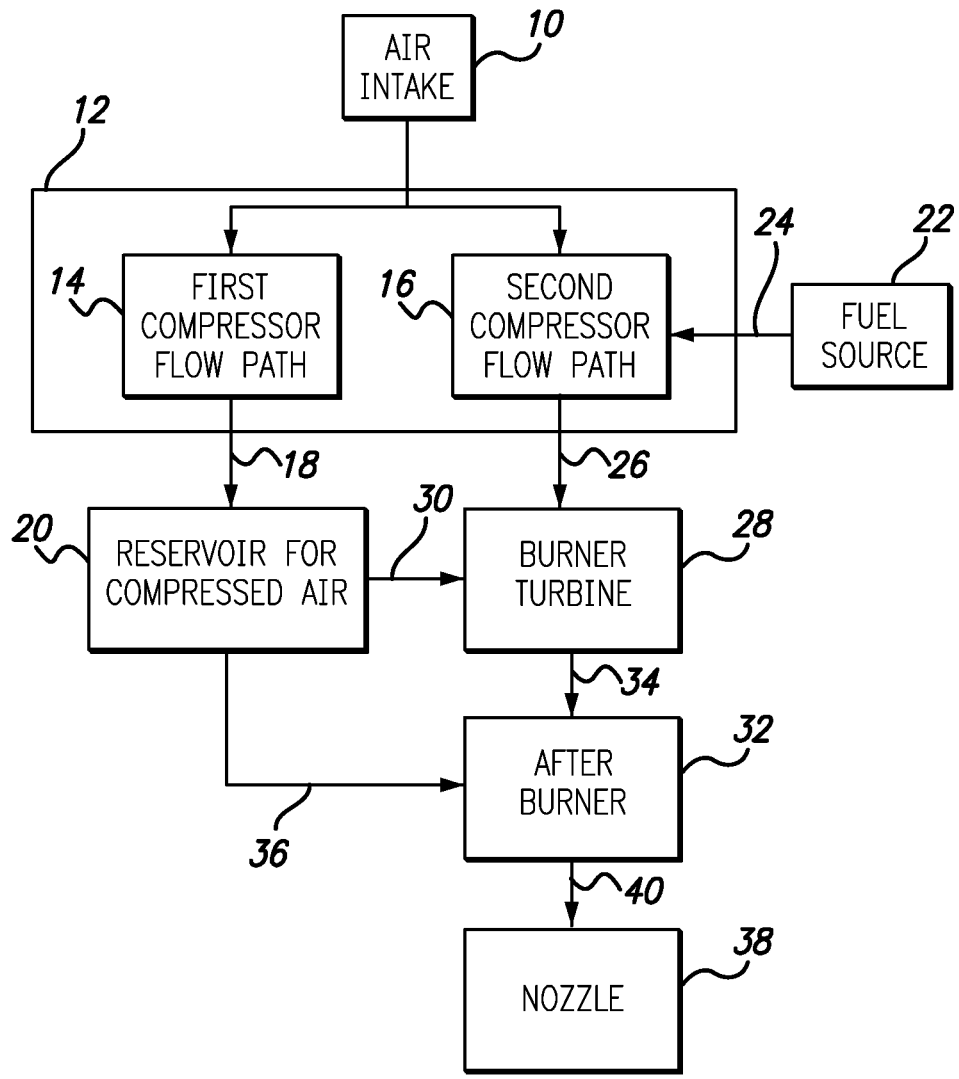
FIG. 1 is a block diagram generally illustrating the various sections of the engine of the present invention.

In reference to the drawings and more particularly to FIG. 1, there is illustrated a simplified block diagram of the various portions of the engine constructed in accordance with the principles of the present invention. As is therein shown, there is provided an air intake 10 which is coupled to a compressor section 12. The compressor section 12 defines a first compressor flow path 14 and a second compressor flow path 16. Thus the air which enters the air intake 10 is divided into these two separate flow paths. The compressor compresses the air in the first flow path and directs it as shown by the arrow 18 into a reservoir 20 for the compressed air. Fuel from a fuel source 22 is connected as shown at 24 to the second compressor flow path 16. Fuel from the fuel source 22 is then injected into the second compressor flow path in an amount sufficient that the equivalence ratio of the fuel rich fuel air mixture in the second flow path is above the mixture's flammability limit. By so doing, even though the compressor compresses the fuel rich fuel air mixture and as a result heats it, the fact that the fuel air mixture is above the mixture's flammability limit, the fuel air mixture will not ignite. It should be clearly recognized that the two flow paths are maintained completely separate and distinct in the compressor section 12 of the engine. The compressed fuel air mixture which has been thoroughly mixed by the compressor is then directed as shown by the arrow 26 into a burner turbine section 28. After the fuel rich fuel air mixture has been injected into the burner turbine section 28, a portion of the air from the reservoir 20 is injected into the burner turbine section as shown by the arrow 30. The injection of the air into the fuel rich fuel air mixture in the burner turbine causes intraturbine diffusion layer burning of the fuel air mixture. The intraturbine burning will continue in the burner turbine section 28 until the fuel rich fuel air mixture's equivalence ratio drops to the fuel's upper flammability limit equivalence ratio. The combustion products from the burner turbine section 28 are then passed into an afterburner 32 as shown by the arrow 34. Additional air from the reservoir 20 is also injected into the afterburner 32 as shown by the arrow 36. By adding the additional air into the mixture, the entire volume of fuel air mixture which has not previously burned in the burner turbine section 28 will now combust and will be passed through a nozzle 38 as shown by the arrow 40 to provide thrust as is well known in the turbine engine art.

Figure 2:
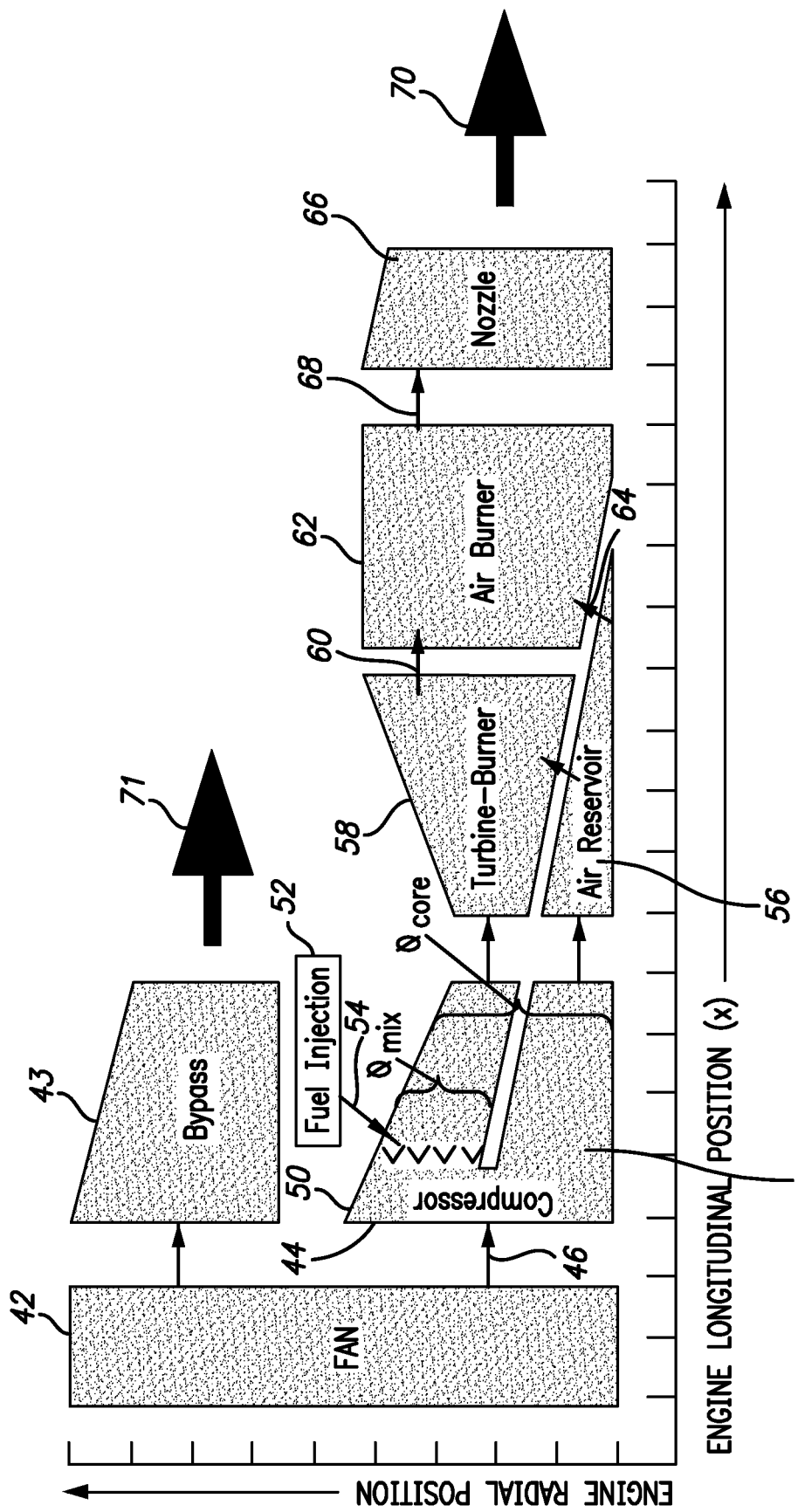
FIG. 2 is a schematic representation of the positioning of the various sections of the engine both longitudinally and radially.

By referring now more particularly to FIG. 2, there is illustrated a schematic of an engine of the present invention as generally described in conjunction with the block diagram of FIG. 1. The schematic as shown in FIG. 2 is generated to illustrate the various longitudinal positions of each of the elements within the engine as well as the radial positions thereof within the engine. Such is accomplished by showing the engine longitudinal position along the abscissa and the engine radial position along the ordinate. Obviously these are relative and are illustrated in schematic form only. In addition thereto, the schematic of FIG. 2 illustrates not only the elements of the core of the engine as shown in the block diagram of FIG. 1, but also adds the additional elements of a fan 42 and a bypass 43 for the typical turbofan engine. As shown in FIG. 2, at the beginning of the engine, there is provided the fan 42 which generates an air flow into the intake of the compressor 44 as shown by the arrow 46. The compressor is divided into two sections as shown at 48 and 50 to illustrate the fact that there are two distinct flow paths. Fuel from a source 52 is then injected as shown by the arrow 54 into the top flow path 50 of the compressor 44. The compressor 44 then compresses the air in the bottom of the first flow path 48 and directs it into a reservoir 56 for the compressed air. The fuel rich air fuel mixture in the top flow path 50 is then directed into the turbine burner section 58. Air flow the air reservoir 56 is then injected into the fuel rich air fuel mixture in the turbine burner section to generate the intraturbine diffusion layer burning of the fuel rich fuel air mixture. The combustion products from the turbine burner section then pass as shown by the arrow 60 into an afterburner section 62. Additional air from the air reservoir 56 is then injected into the afterburner 62 as shown by the arrow 64 to cause any residual amount of the fuel air mixture that has not combusted in the turbine burner section to combust in the afterburner. The final combustion products are then injected into and pass through the nozzle 66 as shown by the arrow 68 to produce thrust along with the bypass air as shown by the arrows 70 and 71.

Figure 3:
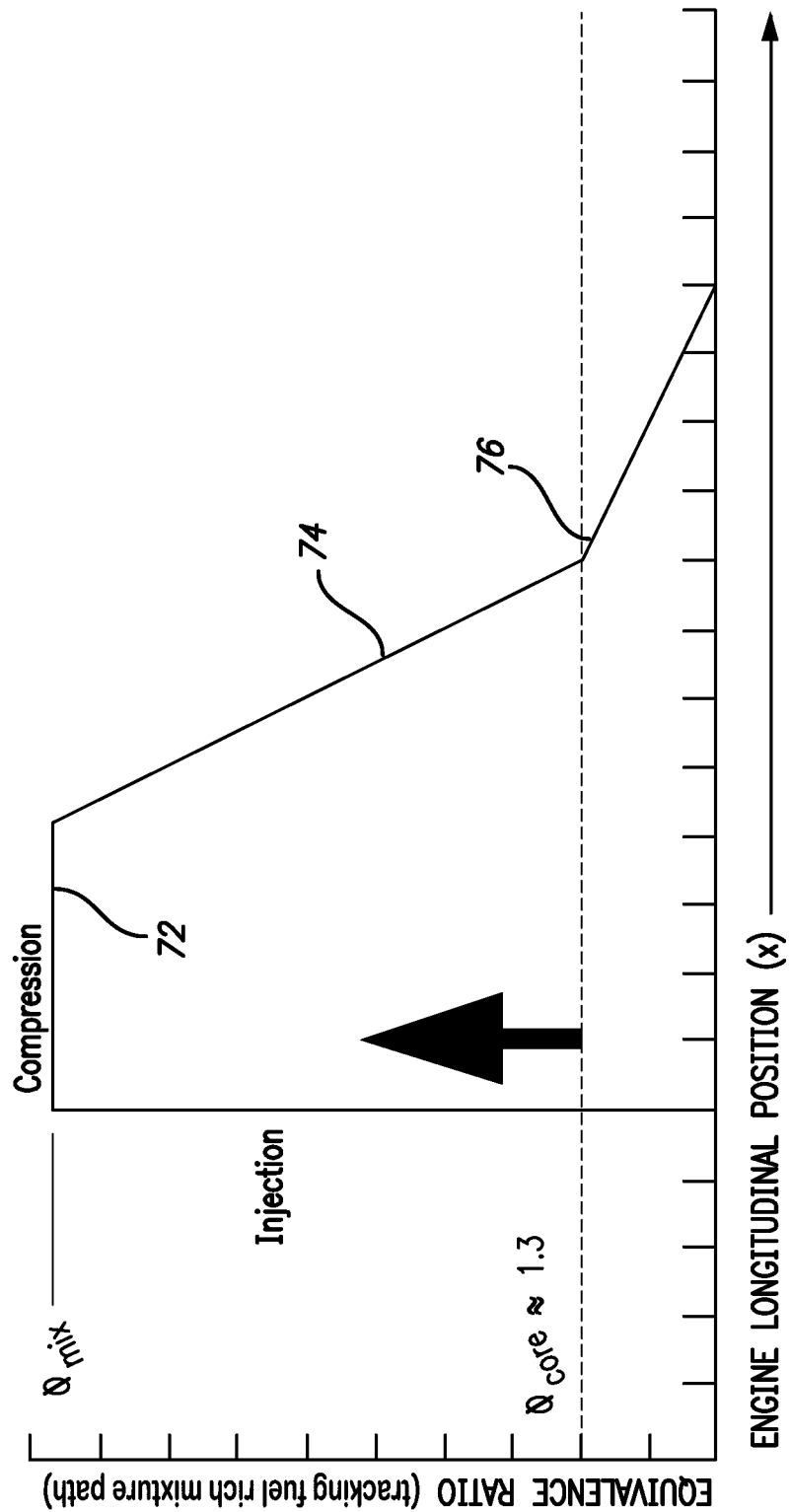
FIG. 3 is a graph illustrating the equivalence ratio of the fuel air mixture at various positions in the engine.

Reference now is made to FIG. 3 which is a graph which is taken by reference to the longitudinal position of the various portions of the engine as shown in FIG. 2 and shows the equivalence ratio of the fuel air mixture at various positions in the various sections of the engine. As is shown, when the fuel is injected, the fuel air mixture has an equivalence ratio above the upper flammability limit and such is indicated at 72. The fuel is thoroughly mixed and the equivalence ratio remains at the level shown in 72 throughout this mixing stage as the fuel rich air fuel mixture is compressed. When the fuel air mixture is then passed into the turbine burner section and the air from the air reservoir is also injected, the burning of the fuel begins so that there is intraturbine diffusion layer burning and as such occurs, the equivalence ratio begins to drop as shown by the curve 74 until it reaches the upper flammability limit equivalence ratio of the fuel as is shown at 76. Once the combustion products from the turbine burner section are passed into the afterburner additional air is also injected therein and combustion occurs in the afterburner.

Figure 4:
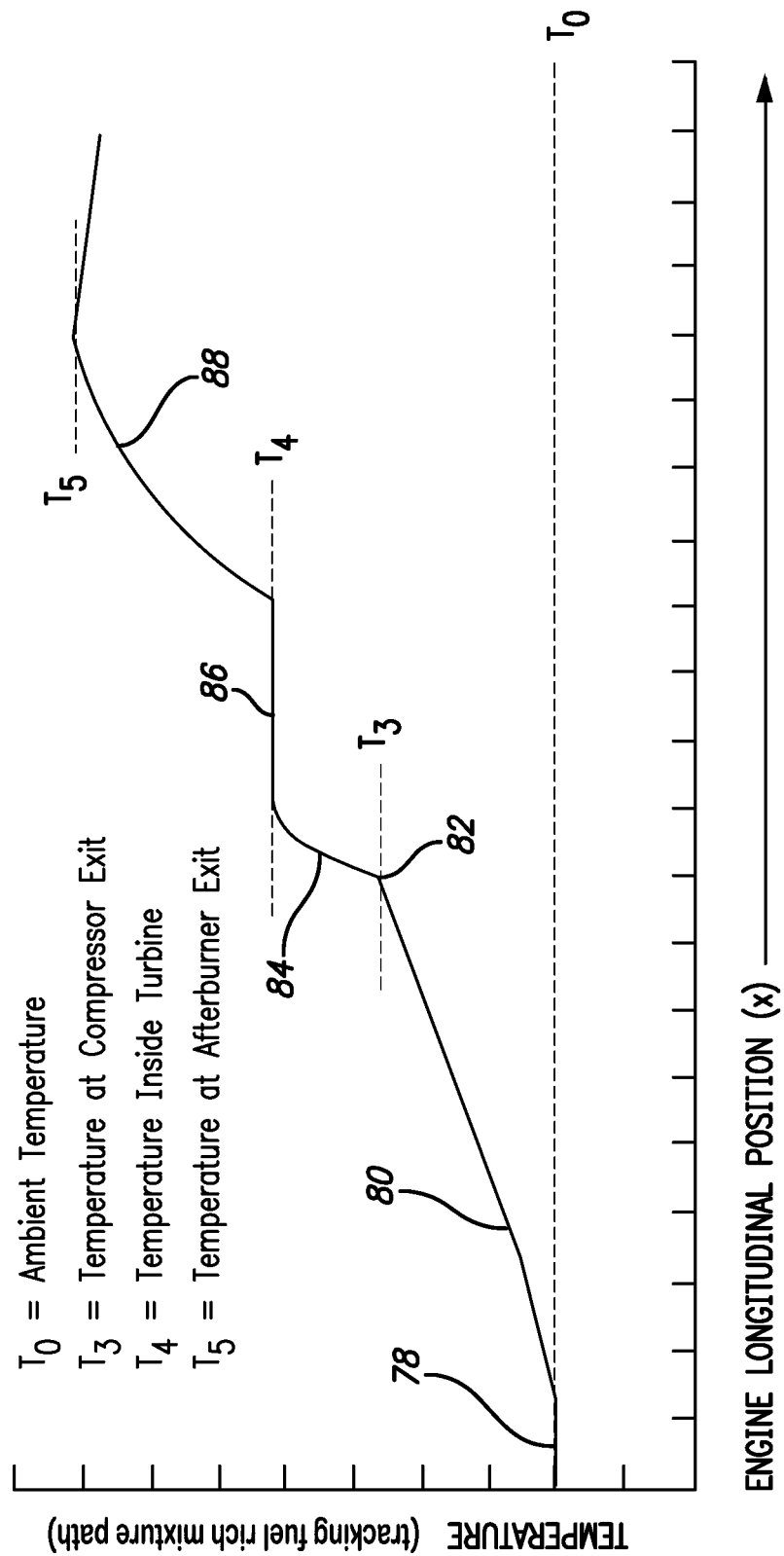
FIG. 4 is a graph illustrating the temperatures in the engine at various positions thereof.

As shown in FIG. 4, temperatures at various positions in the engine are illustrated and as indicated at 78 there is the ambient temperature. Then as the air is injected into the compressor, the temperature begins to rise as shown at 80 and then at the exit of the compressor section, the temperature is shown at 82. Then as the fuel air mixture is burned in the turbine burner section, the temperature increases as shown at 84 until it reaches an upper level as shown at 86 where it remains relatively constant during the intraturbine burning of the fuel air mixture. Thereafter when the combustion products are injected into the afterburner 62, the temperature rises because the additional air is also injected and combustion occurs. This is illustrated at 88.

Figure 5:
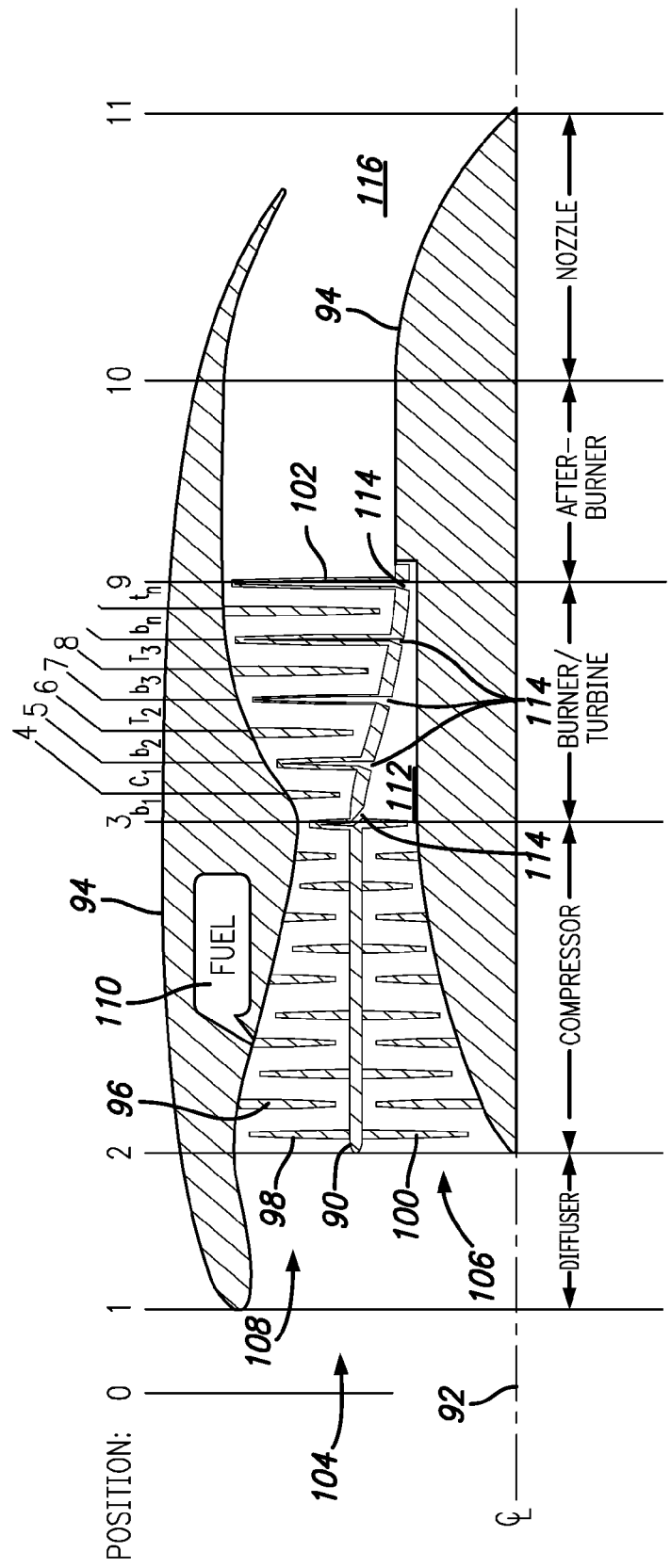
FIG. 5 is a schematic representation illustrating the compressor and the burner turbine sections of the engine of the present invention.

Referring now more particularly to FIG. 5, there is provided a simplified illustration of the compressor and burner turbine sections along with the afterburner and nozzle to illustrate the principles of the present invention. As is therein shown, a centra-skeletal rotor drum 90 is illustrated. The rotor drum 90 rotates about a centerline 92 and is the only moving part in the illustration of FIG. 5. The outer portion 94 as illustrated in FIG. 5 is stationary and includes a plurality of stator blades as shown at 96 which extend inwardly toward the rotor drum 90. The centra-skeletal rotor drum has a plurality of rotor blades extending therefrom. In the compressor section, the rotor blades extend both outwardly away from the centerline 92 as shown at 98 and inwardly toward the centerline 92 as shown at 100. However, in the burner turbine section, the rotor blades only extend outwardly away from the centerline as shown for example at 102. The rotor drum 90 in the compressor section is non-permeable. As a result thereof, air which enters the engine as shown by the arrow 104 is divided by the non-permeable drum into a first flow path as shown at 106 and a second flow path as shown at 108 which flow paths are maintained separate. The air is compressed by the rotor blades in the compressor section as is well known in the art. The major distinction in the compressor section from compressors illustrated in other turbine engines is the utilization of the centra-skeletal rotor drum to separate the air flow and keep it into two separate areas as illustrated at 106 and 108. Fuel from a source 110 is then injected into the second air flow path 108 in the compressor section. This may be accomplished by providing small holes in the compressor's stator blades which allows the fuel to pass into the air in the flow path 108 so that it is compressed, heated, vaporized and very thoroughly mixed on its path through the compressor in the flow path 108. It should clearly be understood that none of the fuel which is injected into flow path 108 is allowed to enter the air in flow path 106. As above indicated, the fuel air mixture in the flow path 108 is such that it has an equivalence ratio above the mixture's flammability limit and therefore even though the fuel air mixture is compressed and heated by the compressor in the flow path 108 because the equivalence ratio is much higher than the flammability limit of the fuel air mixture it will not ignite. The air in the flow path 106 is compressed as it passes through the compressor section and is then passed into a reservoir 112 where it resides under pressure. The fuel rich fuel air mixture is passed from the compressor section into the burner turbine section. At the same time it should be understood that the rotor drum 90 is now permeable in the burner turbine section. Such is illustrated at 114. As a result air under pressure from the reservoir 112 is allowed to enter through the openings 114 in the rotor drum 90 to the interior of the rotor blades one of which is shown at 102. The rotor blades in the burner turbine section also have a plurality of small openings therein. As a result, the air from the reservoir is allowed to pass through the openings in the rotor blades in the burner turbine section. These holes are designed as thin film cooling type holes in the turbine blades. This will allow burning to begin in the burner turbine section because as the air is injected through the thin film cooling type holes, diffusion layer burning will be initiated on the boundary layer where the two flows intersect and will also provide cooling for the rotor blades. The flow rate of the air from the reservoir 112 can be regulated to provide continuous burning within the burner turbine section and such burning will be maintained at a desired temperature. In addition, different blade hole configurations may be utilized so that burning can be effected on only one side of the turbine blades to thereby increase the turbine's ability to extract work. As air continues to be passed through the thin film cooling type holes in the turbine blades, the intraturbine burning of the fuel air mixture is continued until the fuel rich mixture's equivalence ratio has been dropped from the high number at which it entered the turbine to the fuel's upper flammability limit equivalence ratio, for example, an equivalence ratio of about 1.3 for jet fuel at high velocities.

The combustion products from the burner turbine section are then passed into the afterburner section and additional air from the reservoir 112 would be passed through openings in the rotor drum 90 into the afterburner section to cause the entire volume of the air fuel mixture to combust and exit through the nozzle 116.

Figure 6:
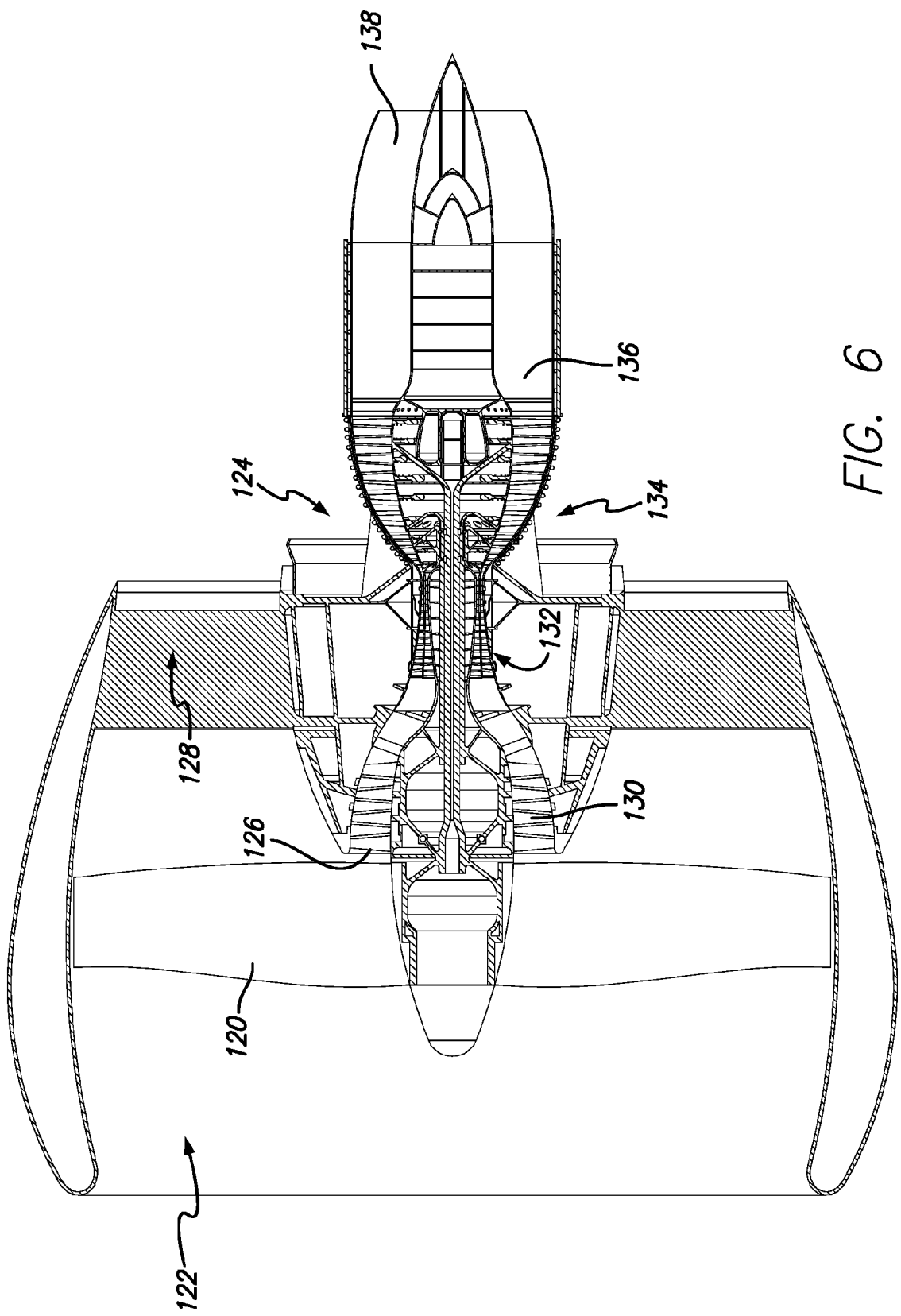
FIG. 6 illustrates the engine including the fan and bypass sections thereof.

By referring now more specifically to FIG. 6, there is illustrated a turbofan engine constructed in accordance with the principles of the present invention as above described. As is shown in FIG. 6, there is provided a fan 120 which generates air intake as shown at 122 which enters the core engine 124 through the intake 126. Additional air is bypassed as shown by the arrow 128 and functions as is well known in the jet engine art. The engine includes a low pressure area 130 which passes air into the compressor section 132 which contains the centra-skeletal rotor drum as above described in conjunction with FIG. 5. The air passes accordingly through the two flow paths and into the burner turbine section 134 where the fuel air mixture is burned as above described. These combustion products then pass into the afterburner 136 and out the nozzle 138 along with the bypass air 128 to provide the desired thrust.

Figure 7:
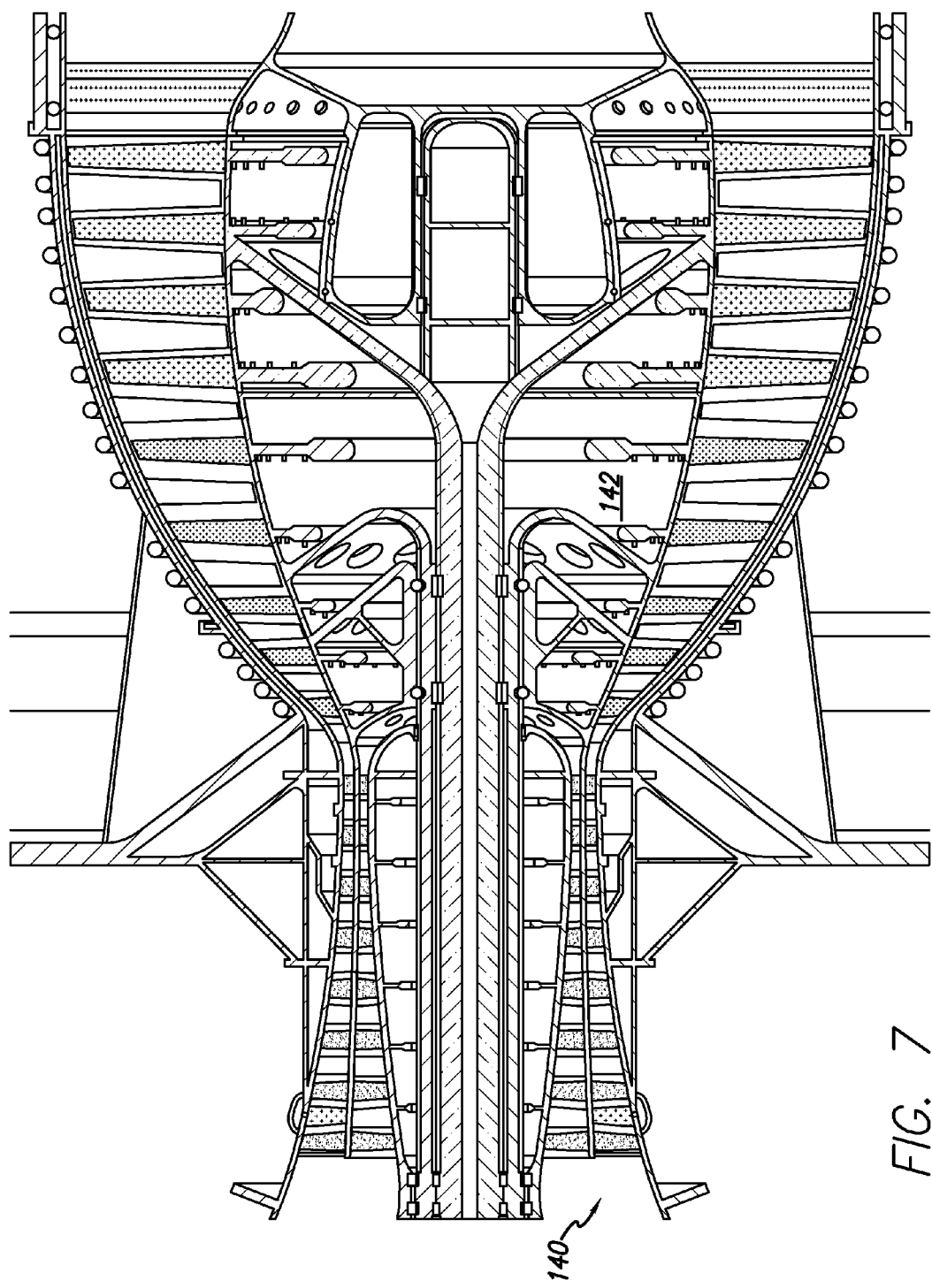
FIG. 7 is an enlarged view of the compressor and burner turbine sections of the engine as shown in FIG. 6.

FIG. 7 provides a more detailed illustration of the compressor and burner turbine sections of the engine as illustrated in FIG. 6. As is shown by the arrow 140, air is flowing into the compressor section of the engine. As above described and as here illustrated the centra-skeletal rotor drum is shown at 3 and divides the air flow into two separate paths as above described. Fuel is injected at the position as shown at 1 by passing it through the small holes in the compressor's stator blade so that a fuel air mixture is compressed, heated, vaporized and very thoroughly mixed on its path through the compressor section. Again as above described, the amount of fuel injected is such that the equivalence ratio of the fuel rich fuel air mixture is above the mixture's flammability limit so that even though the fuel air mixture is heated to a relatively high temperature, it will not ignite or burn. The air in the flow path as shown at 2 is not mixed with the fuel, but is compressed and passes into the pressure reservoir as shown at 142 in FIG. 7.

As shown at 5, the fuel rich fuel air mixture is passed into the burner turbine where expansion occurs along with intraturbine burning as shown at 6. Each of the rotor blades in the burner turbine section is provided with a plurality of thin film cooling holes that communicate with the air pressure reservoir 142. Air under pressure from the reservoir 142 is then forced through the thin film cooling holes appearing in the rotor blades in the turbine section and when the hot gases fuel rich mixture flowing around the turbine blades is contacted by the air passing through the thin film cooling holes, boundary burning is initiated. This is the diffusion layer burning and it only exists momentarily in a very controlled layer around the rotor blade. This allows for precise temperature and equivalence ratio control. As above indicated, the intraturbine burning will continue until the fuel rich mixture's equivalence ratio has been dropped from the high number at which it entered the turbine to the fuel's upper flammability limit equivalence ratio.

Figure 8:
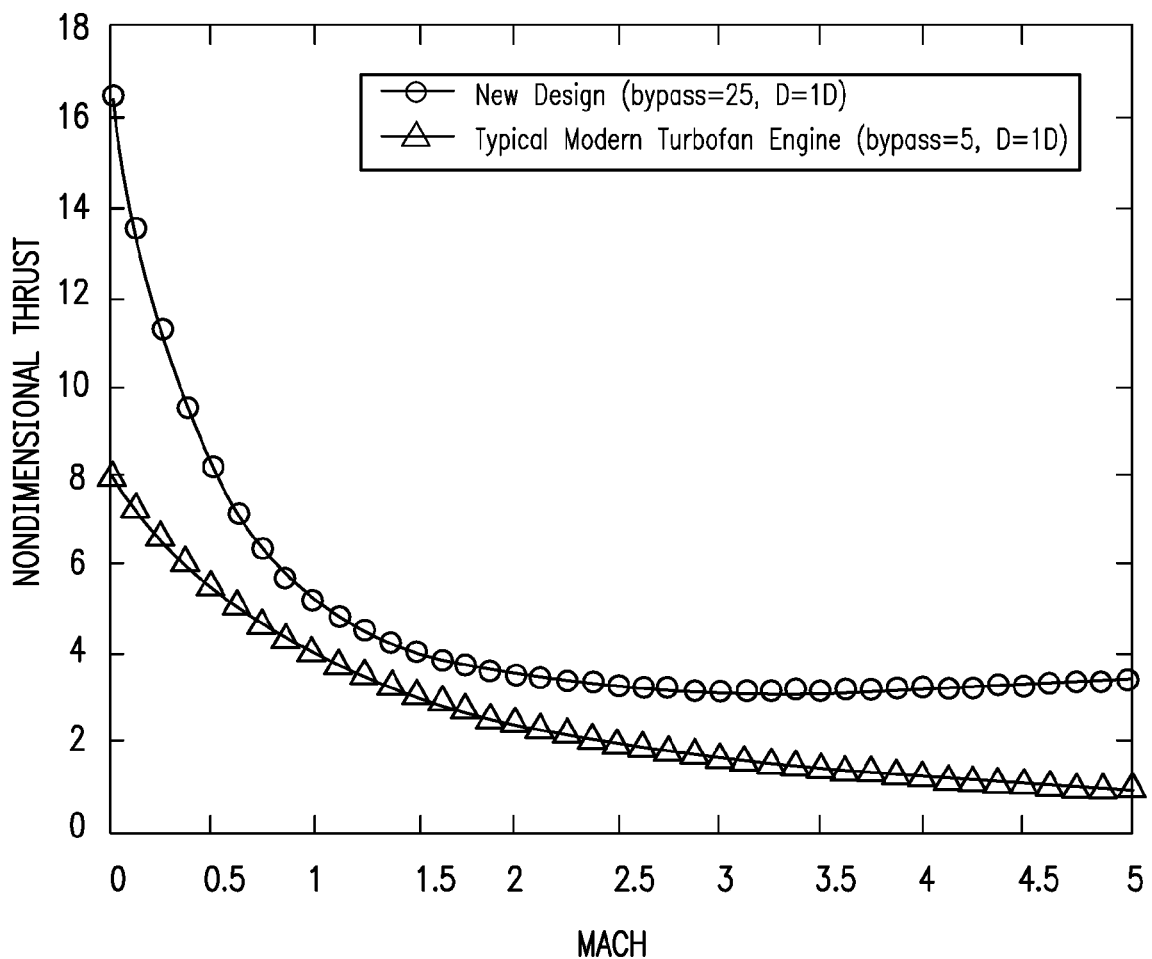
FIG. 8 is a graph comparing the non-dimensional thrust as compared to air speed of the engine of the present invention with a typical modern turbofan engine.

FIG. 8 to which reference is hereby made is a graph showing the results of a mathematical analysis for a turbofan engine constructed in accordance with the principles of the present invention as compared to a typical modern turbofan engine. As illustrated, the non-dimensional thrust of an engine constructed in accordance with the principles of the present invention approximately doubles at low speeds and at higher speeds is consistently greater than that of the typical modern turbofan engine and when the speeds reach high Mach numbers on the order of 4 to 5, the non-dimensional thrust of an engine constructed in accordance with the present invention again doubles.

Figure 9:
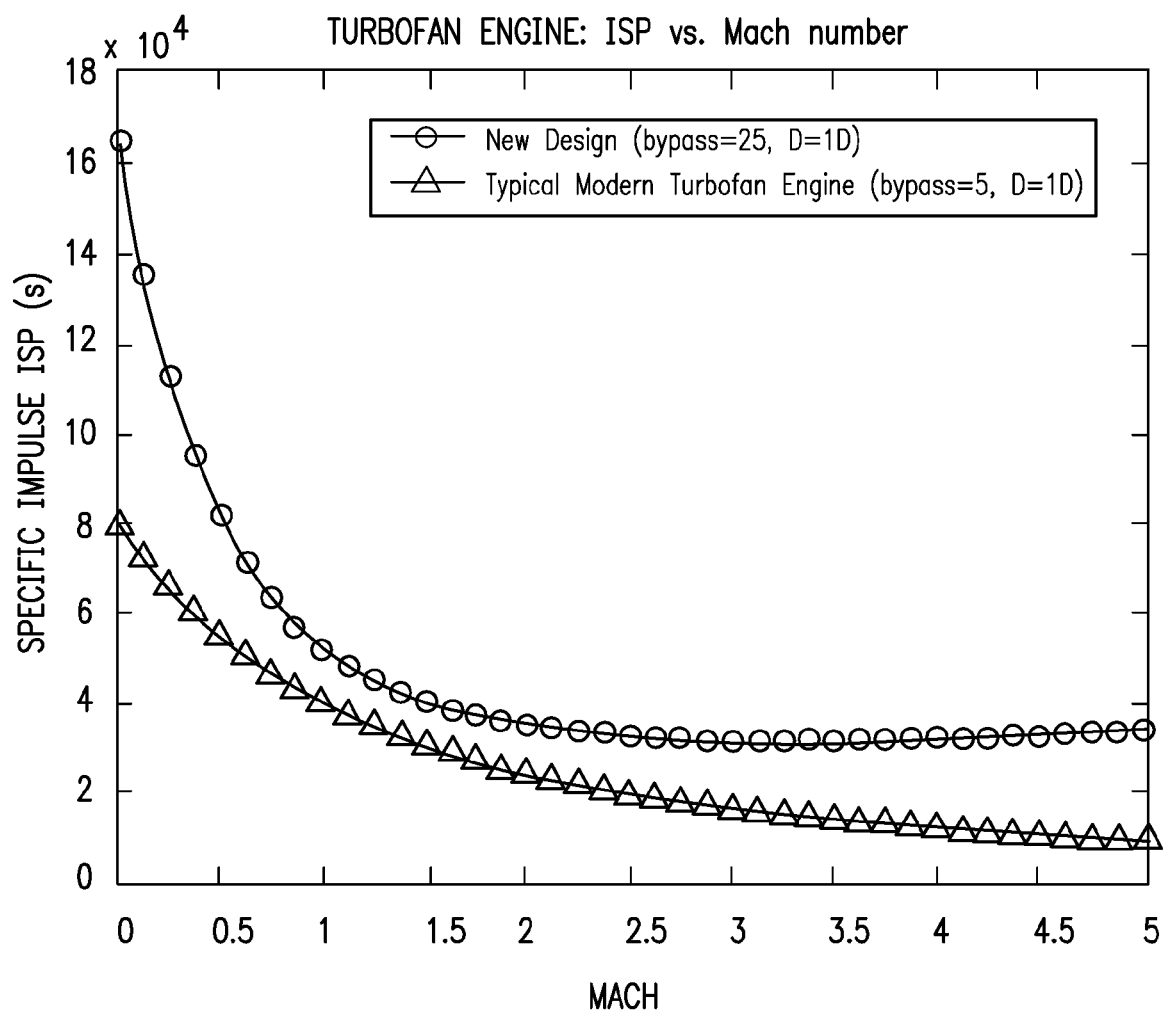
FIG. 9 is a graph illustrating the comparison of the specific impulse with respect to air speed of the engine of the present invention with a typical modern fan engine.

FIG. 9 is a graph showing the specific impulse as compared to Mach numbers of an engine constructed in accordance with the new design as compared to a typical modern double fan engine. Again, it is shown that at low speeds the specific impulse approximately doubles as it does at the high speeds on the order of Mach 4 to 5.

Figure 10:
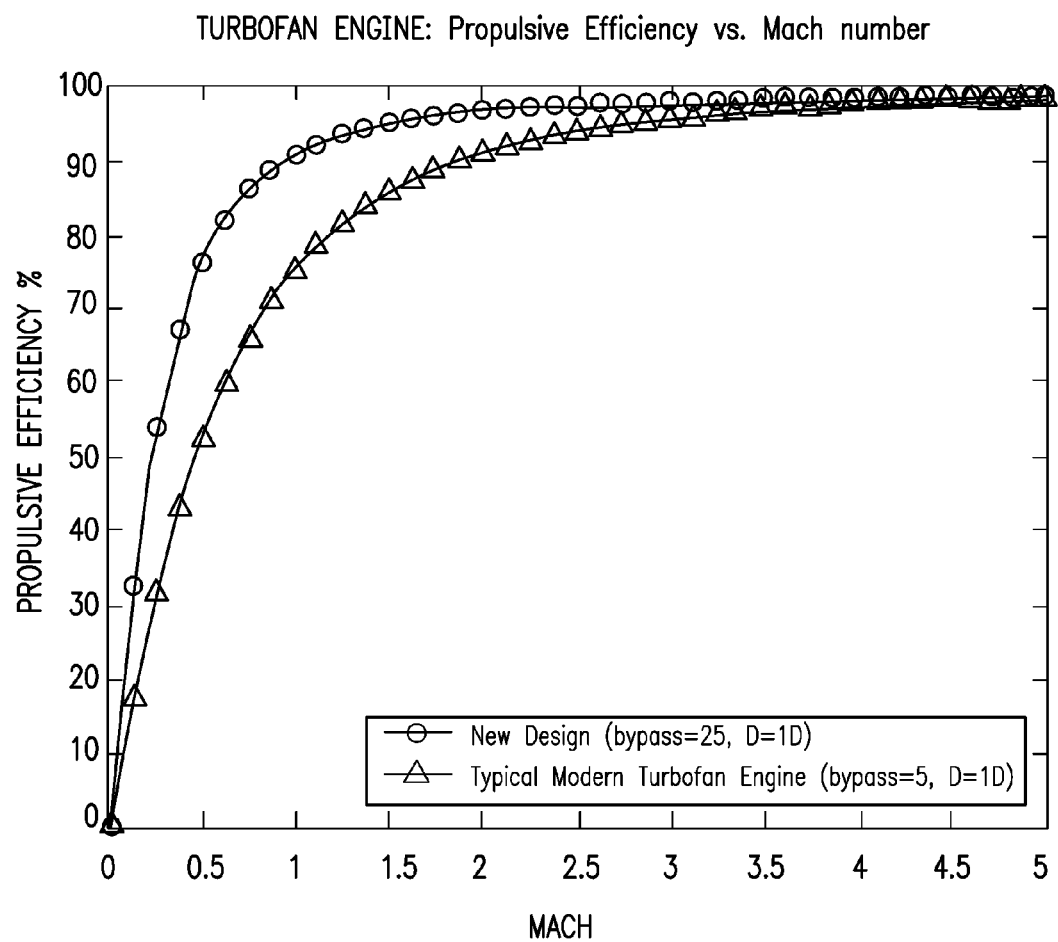
FIG. 10 is a graph illustrating the propulsive efficiency compared to air speed of the engine of the present invention compared to a typical modern turbofan engine.

FIG. 10 is a graph showing the propulsion efficiency of an engine constructed in accordance with the new design as compared to a typical modern turbofan engine, and as illustrated, the propulsive efficiency of the new engine exceeds that of the typical modern turbofan engine.

Figure 11:
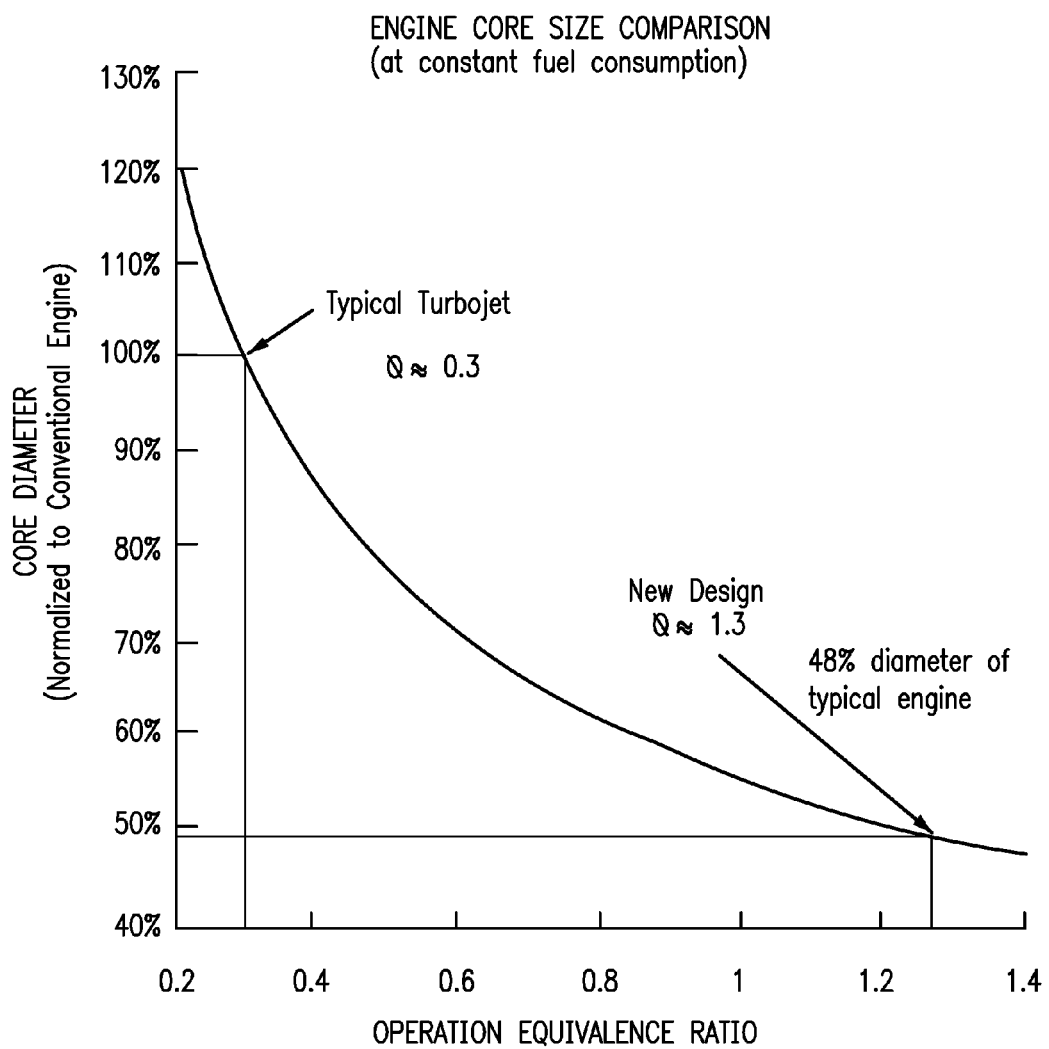
FIG. 11 is a graph comparing the size of the core of the invention engine to the core of a typical turbojet engine.

FIG. 11 is a graph comparing the engine core size of the present invention to a typical turbojet engine. As shown the engine core size of the present invention is approximately one-half that of the typical turbojet engine.

There has thus been described a turbine engine which does not include a combustion chamber and is smaller in size by an order of approximately one-half from a typical modern turbofan engine but yet produces highly efficient operation and increased thrust as compared to the typical modern turbofan engine.

What is claimed is:

1. An engine comprising:
   (A) an air intake, a compressor section, a burner turbine section, an afterburner section and a nozzle disposed in series within an outer portion;
   (B) a rotating drum having an outer surface and an inner surface disposed in said compressor section and said burner turbine section;
   (C) said rotating drum being non-permeable in said compressor section and dividing air flow from said air intake into first and second air flow paths which are maintained separate throughout said compressor section;
   (D) a source of fuel coupled to said compressor section only at said second air flow path to inject fuel into said second air flow path in an amount sufficient to establish a fuel rich fuel air mixture having an equivalence ratio above the mixture flammability limit to preclude burning or combustion of the fuel air mixture in the compressor section;

(E) said rotating drum being permeable in said burner turbine section to inject air under pressure from said first air flow path into said fuel rich fuel air mixture in said second air flow path to reduce the equivalence ratio to a level to establish and maintain intraturbine burning of said fuel air mixture;

(F) said rotating drum having rotor blades extending outwardly from both said outer surface and said inner surface in said compressor section;

(G) said rotating drum having rotor blades extending outwardly from said outer surface only in said burner turbine section; and (H) said outer portion including stator blades interspersed between said rotor blades.

2. An engine as defined in claim 1 wherein at least one of said stator blades in said second flow path defines a plurality of openings therethrough, said source of fuel being coupled to said at least one of said stator blades to inject fuel into said second flow path to create said fuel rich fuel air mixture.

3. An engine as defined in claim 1 wherein each of said rotor blades in said burner turbine section defines a plurality of openings therethrough to inject said compressed air into said burner turbine section for generating said intra turbine burning.

4. An engine as defined in claim 1 which further includes a fan upstream of said air intake.

5. An engine as defined in claim 1 wherein said permeable rotating drum extends into said afterburner section to inject air under pressure into said afterburner section to continue burning of the fuel air mixture contained therein.

* * * * *